(12) United States Patent
Barber et al.

(10) Patent No.: US 9,897,228 B2
(45) Date of Patent: Feb. 20, 2018

(54) VALVE HAVING OPPOSING RIGHT-ANGLE ACTUATORS

(71) Applicant: Caterpillar Inc., Peoria, IL (US)

(72) Inventors: Dennis Ray Barber, Plainfield, IL (US); Matthew J. Beschorner, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 166 days.

(21) Appl. No.: 14/934,576

(22) Filed: Nov. 6, 2015

(65) Prior Publication Data

US 2017/0130864 A1 May 11, 2017

(51) Int. Cl.
| | |
|---|---|
| *F16K 31/06* | (2006.01) |
| *F16K 31/42* | (2006.01) |
| *F16K 11/07* | (2006.01) |
| *F15B 11/08* | (2006.01) |
| *F15B 13/04* | (2006.01) |

(52) U.S. Cl.
CPC ............ *F16K 31/426* (2013.01); *F15B 11/08* (2013.01); *F15B 13/0402* (2013.01); *F16K 11/07* (2013.01); *F15B 2211/20576* (2013.01); *F15B 2211/255* (2013.01); *Y10T 137/86622* (2015.04)

(58) Field of Classification Search
CPC ........ F16K 31/26; F16K 11/07; F16K 11/255; F16K 31/426; F15B 11/08; F15B 13/0402; F15B 2211/20576; F15B 11/255; Y10T 137/86582; Y10T 137/86606; Y10T 137/86614; Y10T 137/86622; Y10T 137/86574; Y10T 137/87056

USPC ... 137/625.65, 625.6, 625.2, 625.63, 625.64, 137/636; 91/447, 368, 453, 374, 465; 60/444

See application file for complete search history.

(56) References Cited

U.S. PATENT DOCUMENTS

| | | | |
|---|---|---|---|
| 3,653,409 A | 4/1972 | Brannon | |
| 3,875,849 A * | 4/1975 | Patel | F15B 9/08 137/625.64 |

(Continued)

OTHER PUBLICATIONS

U.S. Application of Dennis Ray Barber entitled "Valve Having Right-Angle Proportional and Directional Actuators" filed Nov. 6, 2015.

(Continued)

*Primary Examiner* — Craig J Price
(74) *Attorney, Agent, or Firm* — Finnegan, Henderson, Farabow, Garrett & Dunner, LLP

(57) ABSTRACT

A valve is disclosed for use with a hydraulic circuit including a valve block, a central bore and an actuator passage formed in the valve block, and at least one of a supply and a drain passage. The valve also includes a control spool movable to selectively connect the actuator passage and at least one of the supply passage and the drain passage. The control spool includes a base end, and a tip end with a tapered outer surface. The valve also includes a first actuator configured to selectively direct pilot fluid to the tip end of the control spool, and a second actuator configured to selectively direct pilot fluid to the base end of the control spool. The first and second actuators each include a primary axis oriented generally orthogonal to an axis of the control spool, and are located at opposing sides of the control spool.

17 Claims, 2 Drawing Sheets

(56) References Cited

U.S. PATENT DOCUMENTS

| | | | | |
|---|---|---|---|---|
| 4,011,891 | A | * | 3/1977 | Knutson .................... F15B 9/08 137/625.62 |
| 4,079,660 | A | * | 3/1978 | Ives ........................ F01L 23/00 137/625.68 |
| 4,376,453 | A | * | 3/1983 | Moretti ............... F15B 13/0431 137/625.64 |
| 4,456,031 | A | | 6/1984 | Taplin |
| 4,569,273 | A | * | 2/1986 | Anderson ........... F15B 13/0435 137/596.2 |
| 4,869,065 | A | * | 9/1989 | Hopkins ................ F16H 61/46 60/444 |
| 4,958,553 | A | * | 9/1990 | Ueno ..................... F15B 13/01 137/596.15 |
| 5,240,041 | A | | 8/1993 | Garnjost |
| 5,588,465 | A | * | 12/1996 | Witowski ............ F15B 13/0402 137/596.16 |
| 6,039,077 | A | | 3/2000 | Schulze |
| 6,481,463 | B1 | | 11/2002 | Harms |
| 6,561,221 | B1 | * | 5/2003 | Kurz .................... F15B 13/0402 137/596.17 |
| 6,637,461 | B2 | | 10/2003 | Post |
| 7,422,033 | B2 | | 9/2008 | Barber |
| 8,453,678 | B2 | * | 6/2013 | Neff ....................... F16K 11/07 137/625.27 |
| 8,479,768 | B2 | | 7/2013 | Kunz et al. |
| 9,523,442 | B2 | * | 12/2016 | Hayashi .............. F16K 11/0704 |
| 2003/0006729 | A1 | | 1/2003 | Raymond |
| 2008/0017261 | A1 | | 1/2008 | Harms et al. |
| 2011/0017321 | A1 | | 1/2011 | Kunz et al. |
| 2017/0097098 | A1 | * | 4/2017 | Beschorner ........... F16K 3/0254 |
| 2017/0130745 | A1 | * | 5/2017 | Barber .................. F15B 13/021 |

OTHER PUBLICATIONS

U.S. Application of Dennis Ray Barber entitled "Electrohydraulic Valve Having Dual-Action Right-Angle Pilot Actuator" filed Nov. 6, 2015.

\* cited by examiner

VALVE HAVING OPPOSING RIGHT-ANGLE ACTUATORS

TECHNICAL FIELD

The present disclosure relates generally to a valve and, more particularly, to a valve having opposing right-angle actuators.

BACKGROUND

Hydraulic machines such as dozers, loaders, excavators, backhoes, motor graders, and other types of heavy equipment use one or more hydraulic actuators to accomplish a variety of tasks. These actuators are fluidly connected to a pump of the machine that provides pressurized fluid to chambers within the actuators, and also connected to a sump of the machine that receives low-pressure fluid discharged from the chambers of the actuators. As the fluid moves through the chambers, the pressure of the fluid acts on hydraulic surfaces of the chambers to affect movement of the actuators. A flow rate of fluid through the actuators corresponds to a velocity of the actuators, while a pressure differential across the actuators corresponds to a force of the actuators.

Control over the speed and/or force of hydraulic actuators can be provided by way of one or more metering valves. For example, a first metering valve controls fluid flow into a head-end of a hydraulic cylinder, while a second metering valve controls fluid flow out of the head-end. Likewise, a third metering valve controls fluid flow into a rod-end of the hydraulic cylinder, while a fourth metering valve controls fluid flow out of the rod-end. The different metering valves are cooperatively opened and closed (e.g., based on operator input) to cause fluid to flow into one end of the hydraulic cylinder and simultaneously out of an opposing end, thereby extending or retracting the hydraulic cylinder.

A conventional metering valve includes a body having a bore that receives a spool, and two or more passages formed in the body that communicate with each other via the spool. The spool is generally cylindrical, and includes lands that extend outward away from the body at either side of a valley or annular groove. When the lands are positioned at one or more entrances of the passages, the spool is in a flow-blocking position. When the spool is moved to a flow-passing position, the valley bridges the entrances such that fluid communication between the passages is established via the valley.

Conventional valves can be large and require a significant amount of energy to move them quickly between the flow-blocking and flow-passing positions. For this reason, pilot valves are often located at opposing ends of the spool, and function to selectively communicate pressurized pilot fluid with the spool ends. This arrangement, however, can consume a significant amount of space, making the valve large and difficult to package.

One attempt to address the issues discussed above is disclosed in U.S. Pat. No. 6,637,461 (the '461 patent) by Post that issued on Oct. 28, 2003. In particular, the '461 patent discloses a valve assembly having a primary control spool configured to meter fluid flow to a work port, and a piston connected to one end of the control spool to define first and second opposing pressure chambers. First and second electrohydraulic actuators are located together at one end of the primary control spool and cooperate to control movement of the control spool via the piston. In particular, the second pressure chamber is always filled with pressurized fluid, but has a smaller hydraulic surface area than the first pressure chamber. Thus, when pressurized fluid is not being directed into the first pressure chamber, the fluid pressure in the second pressure chamber creates a force imbalance on the piston that causes the primary control spool to move in a first direction. And when pressurized fluid is being directed into the first chamber by the actuators, the fluid pressure in the first chamber creates a force imbalance on the piston that causes the main control spool to move in a second direction. A feedback pin rides on ramped surfaces of the piston and provides force feedback to the first electrohydraulic actuator.

Although the valve assembly of the '461 patent may benefit from having electrohydraulic actuators at only one end of the control spool, it may still have limited application and high cost. In particular, because the valve assembly requires that a separate piston be connected to the primary control spool, the valve may be long. This may prohibit use of the valve in applications that are space-constrained. In addition, because the piston is separate from the primary control spool, the increased component count may increase a cost of the valve and an assembly cost and difficulty. Further, valve assembly of the '461 patent uses two different types of actuators, which may increase a control complexity and/or cost of the assembly.

The disclosed valve is directed to overcoming one or more of the problems set forth above and/or other problems of the prior art.

SUMMARY

One aspect of the present disclosure is directed to a valve. The valve may include a valve block, a central bore formed in the valve block, an actuator passage formed in the valve block and intersecting with the central bore, and at least one of a supply and a drain passage formed in the valve block and intersecting with the central bore. The valve may also include a control spool movable to selectively connect the actuator passage and the at least one of the supply passage and the drain passage. The control spool may have a base end, and a tip end with a tapered outer surface. The valve may also include a first actuator configured to selectively direct pilot fluid to the tip end of the control spool, and a second actuator configured to selectively direct pilot fluid to the base end of the control spool. Each of the first and second actuators may have a primary axis oriented generally orthogonal to an axis of the control spool, and may be located at opposing sides of the control spool.

Another aspect of the present disclosure is directed to another valve. This valve may include a valve block, a central bore formed in the valve block, an actuator passage formed in the valve block and intersecting with the central bore, and at least one of a supply passage and a drain passage formed in the valve block and intersecting with the central bore. The valve may further include a control spool slidingly disposed in the central bore and movable to selectively connect the actuator passage and the at least one of the supply passage and the drain passage. The control spool may have a base end, and a tip end with a tapered outer surface. The valve may also include a spring located at the base end of the control spool and configured to bias the control spool to a neutral position, a first actuator configured to selectively direct pilot fluid or tank pressure to the tip end of the control spool, and a second actuator configured to selectively direct pilot fluid or tank pressure to the base end of the control spool. Each of the first and second actuators may have a primary axis oriented generally orthogonal to an axis of the control spool, be located at opposing sides of the control spool, and have a follower configured to ride along the tapered outer surface of the control spool at the tip end.

Another aspect of the present disclosure is directed to a hydraulic circuit. The hydraulic circuit may include an actuator, a primary pump, a pilot pump, a sump, and a valve disposed between the actuator, the primary pump, and the sump. The valve may include a valve block, and a central bore formed in the valve block. The valve may also include an actuator passage formed in the valve block and intersecting with the central bore, at least one of a supply passage and a drain passage formed in the valve block and intersecting with the central bore, and a control spool slidingly disposed in the central bore. The control spool may be movable to selectively connect the actuator passage and the at least one of the supply passage and the drain passage. The control spool may have a base end, and a tip end with a tapered outer surface. The valve may additionally include a spring located at the base end of the control spool and configured to bias the control spool to a neutral position, a first actuator configured to selectively direct pilot fluid from the pilot pump or tank pressure associated with the sump to the tip end of the control spool, and a second actuator configured to selectively direct pilot fluid from the pilot pump or tank pressure associated with the sump to the base end of the control spool. Each of the first and second actuators may have a primary axis oriented generally orthogonal to an axis of the control spool, be located at opposing sides of the control spool, and have a follower configured to ride along the tapered outer surface of the control spool at the tip end.

DETAILED DESCRIPTION

Figure 1:
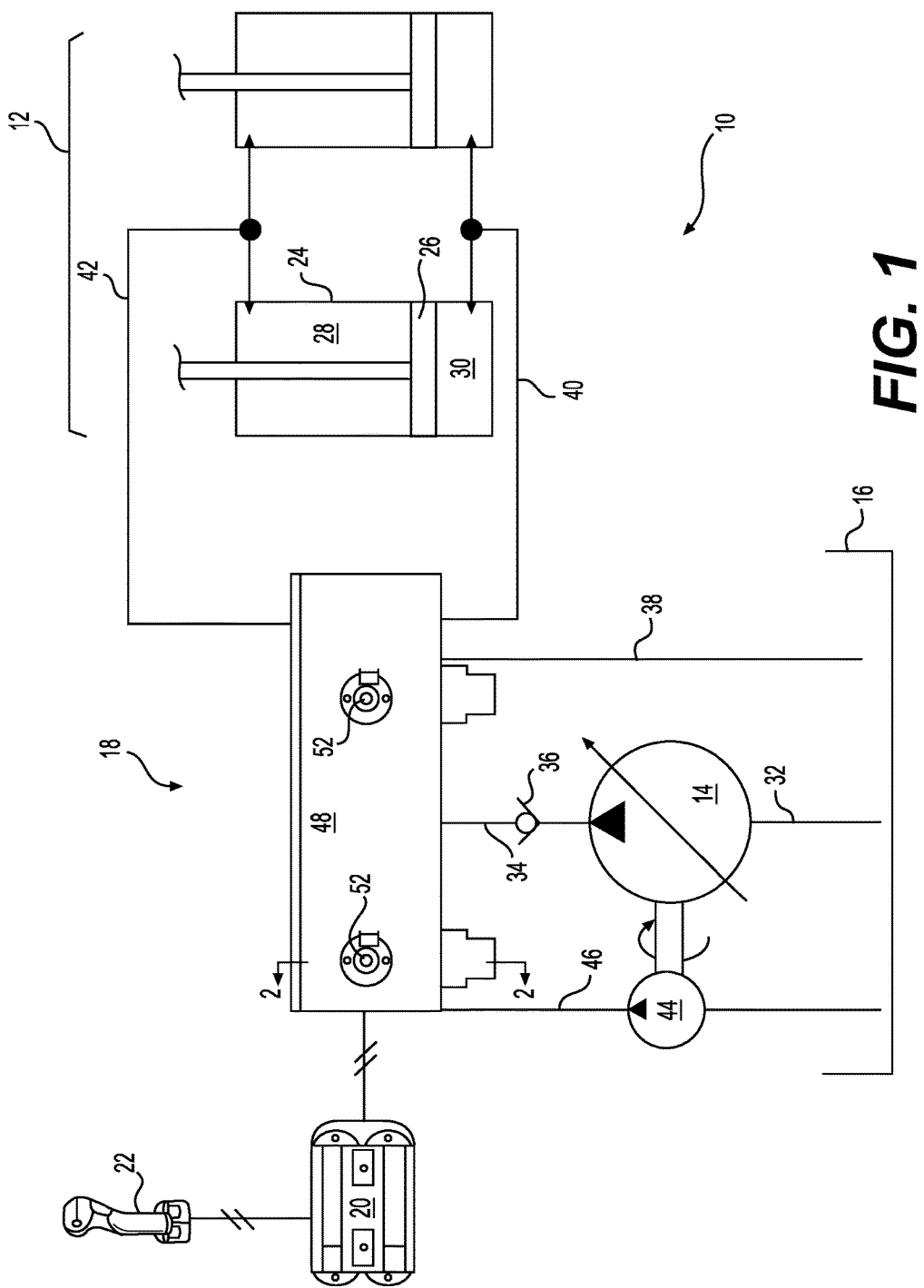
FIG. 1 is a diagrammatic illustration of an exemplary disclosed hydraulic circuit.

FIG. 1 illustrates an exemplary hydraulic circuit 10 having at least one tool actuator 12 that is movable based on input received from an operator. In the disclosed embodiment, two tool actuators 12 are shown that are arranged to operate in tandem. These tool actuators 12 are linear actuators (e.g., cylinders), which are commonly used to raise and lower the boom of a construction machine (e.g., an excavator—not shown). It is contemplated, however, that any number of tool actuators 12 can be included in hydraulic circuit 10, and tool actuators 12 may embody linear or rotary actuators, as desired. Hydraulic circuit 10 may further include a pump 14 configured to draw a low-pressure fluid from a sump 16, to pressurize the fluid, and to direct the pressurized fluid through a valve 18 to tool actuators 12. Valve 18, as will be described in more detail below, may be selectively energized by a controller 20 in response to operator input received via an interface device 22 to regulate a flow direction, a flow rate, and/or a pressure of fluid communicated with tool actuators 12.

Tool actuators 12, as hydraulic cylinders, may each include a tube 24 and a piston assembly 26 arranged within tube 24 to form a first chamber 28 and an opposing second chamber 30. In one example, a rod portion of piston assembly 26 may extend through an end of first chamber 28. As such, first chamber 28 may be considered the rod-end chamber of tool actuator 12, while second chamber 30 may be considered the head-end chamber. Chambers 28, 30 may each be selectively supplied with pressurized fluid and drained of the pressurized fluid to cause piston assembly 26 to displace within tube 24, thereby changing an effective length of tool actuator 12.

It should be noted that, in embodiments where tool actuator 12 is a rotary actuator, the configuration and operation of tool actuator 12 would be similar to that described above for a linear actuator. For example, as a hydraulic motor, tool actuator 12 would include two chambers separated by an impeller. One of these chambers would be selectively supplied with pressurized fluid, while the remaining chamber would be drained of fluid to thereby generate a pressure differential that causes the impeller to rotate. The particular chambers filled with fluid or drained of fluid may dictate the rotational direction of the actuator, while the pressure differential between and flow rate through the chambers may dictate the actuation force and speed, respectively.

Pump 14 may be the primary pump of circuit 10 that is fluidly connected to sump 16 by way of a suction passage 32, and to valve 18 via a pressure passage 34. In some embodiments, a check valve 36 may be disposed in pressure passage 34 to help ensure a unidirectional flow of fluid from pump 14 to valve 18. Pump 14 may be any type of pump known in the art, for example a fixed or variable displacement piston pump, gear pump, or centrifugal pump. Pump 14 may be driven by an engine, by an electric motor, or by another suitable power source.

Sump 16 may be connected to valve 18 via a drain passage 38. Sump 16 may constitute a reservoir configured to hold the low-pressure supply of fluid. The fluid may include, for example, a dedicated hydraulic oil, an engine lubrication oil, a transmission lubrication oil, or any other fluid known in the art. One or more hydraulic circuits may draw fluid from and return fluid to sump 16. It is contemplated that hydraulic circuit 10 can be connected to multiple separate sumps 16 or to a single sump 16, as desired. A relief valve (not shown) can be associated with drain passage 38 to help maintain a desired pressure within hydraulic circuit 10.

Valve 18 may fluidly communicate with tool actuators 12 via head- and rod-end passages 40, 42, and selective pressurization of passages 40, 42 may cause desired actuator movements. For example, to retract tool actuators 12, rod-end passage 42 may be filled with fluid pressurized by pump 14 (i.e., passage 42 may be connected with passage 34), while head-end passage 40 may be drained of fluid (i.e., passage 40 may be connected with passage 38). In contrast, to extend tool actuators 12, head-end passage 40 may be filed with fluid pressurized by pump 14, while rod-end passage 42 may be drained of fluid. As will be described in more detail below, valve 18 may facilitate these connections.

In the disclosed example, valve 18 is electro-hydraulically operated. Specifically, valve 18 may be selectively energized to cause associated elements to move between different positions that generate corresponding pilot signals (i.e., flows of pilot fluid). The pilot fluid may flow from a pilot pump 44 through a pilot passage 46 to valve 18, and cause the connections described above to be made.

Figures 2A, 2B:
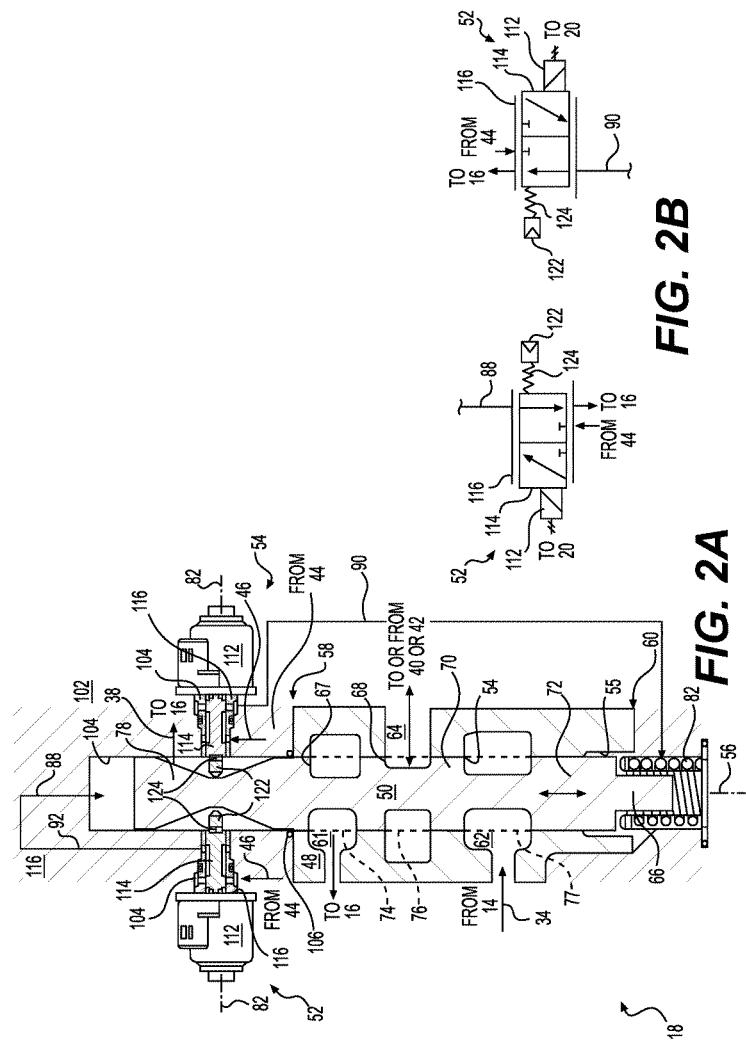
FIG. 2A is a cross-sectional illustration of an exemplary disclosed valve that may be used in conjunction with the hydraulic circuit of FIG. 1.
FIG. 2B is a schematic illustration of the valve of FIG. 2A.

As shown in FIGS. 2A and 2B, valve 18 may consist of at least four primary components, including a valve block 48, a control spool 50 disposed in valve block 48, tip-end pilot actuator ("actuator") 52 configured to selectively meter pilot fluid to a tip end of control spool 50, and a base-end pilot actuator ("actuator") 54 configured to selectively meter pilot fluid to a base end of control spool 50. As will be described in more detail below, the selective communication of pilot fluid to the ends of control spool 50 may cause corresponding axial movements of control spool 50 within valve block 48. It should be noted that FIGS. 2A and 2B illustrate only one exemplary embodiment of valve 18 that can be used to control fluid communication with either of head-end or rod-end passages 40, 42. In particular, the embodiment of valve 18 shown in FIGS. 2A and 2B can be associated with only the head-end of tool actuator 12 or with only the rod-end, and can function to supply fluid to and drain fluid from tool actuator 12. Accordingly, hydraulic circuit 10 (referring to FIG. 1) can have two of the same valves 18 that are shown in FIGS. 2A and 2B to provide for the full functionality of tool actuators 12 or, alternatively, hydraulic circuit 10 can have the one valve 18 shown in FIGS. 2A and 2B and one or more other valves that are not shown. In the disclosed embodiment, valve 18 includes a single common valve block 48 (see FIG. 1), as well as two separate control spools 50 that are disposed in the same valve block 48. In other embodiments, however, each control spool 50 can be associated with a separate valve block 48. If multiple valve blocks 48 are included, they may be bolted together or connected to each other via external conduits.

Valve block 48 may have a bore 55 formed therein for each control spool 50 that is housed in valve block 48. Bore 55 may have a central axis 56, and extend from a first end 58 to a second end 60 along central axis 56. A first passage 61 may be formed adjacent first end 58 that intersects with (i.e., is in fluid communication with) bore 55, a second passage 62 may be formed adjacent second end 60 that also intersects with bore 55, and a third passage 64 may be formed between first and second passages 61, 62 that also intersects with bore 55. In general, first, second, and third passages 61, 62, 64 may be oriented within valve block 48 generally orthogonal to central axis 56, and spaced apart from each other in an axial direction of bore 55. In the disclosed embodiment, bore 55 may be enlarged at each of passages 61, 62, 64 such that, when control spool 50 is disposed inside of bore 55, each of passages 61, 62, 64 may communicate with an entire periphery of control spool 50 at the enlarged locations.

Control spool 50 may be movable inside bore 55 along axis 56 to selectively connect or block fluid flow between passages 61, 62, 64. In particular, control spool 50 may include, among other things, an elongated cylindrical body ("body") 66, and a plurality of lands (e.g., four lands 67, 68, 70 and 72) that protrude radially out past an outer surface of body 66. Body 66 may be configured to slide in an axial direction relative to block 48 and, as will be explained in more detail below, the sliding movement of body 66 may either block or fluidly communicate passages 61, 62, 64 with each other by way of lands 67, 68, 70, 72. In one embodiment, a radial clearance between an outer surface of lands 67, 68, 70, 72 and an inner surface of bore 55 may be small enough to inhibit fluid leakage. In other embodiments, however, one or more of lands 67, 68, 70, 72 may include an annular seal (not shown) to inhibit the leakage.

Lands 67, 68, 70, 72 may each be configured to divide and/or isolate axial spaces inside bore 55. For example, lands 67 and 68 may be located adjacent each other to thereby define an isolated space 74 (a.k.a., a valley or annular groove) therebetween. Similarly, lands 68 and 70 may be located adjacent each other to thereby define an isolated space 76 therebetween. Finally, lands 70 and 72 may be located adjacent each other to thereby define an isolated space 77 therebetween. When control spool 50 is in a neutral position (shown in FIGS. 2A and 2B), space 74 may be aligned with only passage 61 and land 68 may isolate passage 61 from passage 64. Similarly, when control spool 50 is in the neutral position, space 76 may be aligned with only passage 64 and isolated by lands 67 and 70 from passages 61 and 62, respectively. Likewise, when control spool 50 is in the neutral position, space 77 may be aligned with only passage 62, and land 70 may isolate passage 62 from passage 64. However, when control spool 50 is moved to a first actuated position (e.g., upward from the position shown in FIGS. 2A and 2B), space 76 may bridge both of passages 61 and 64, allowing fluid flow therebetween. And when control spool 50 is moved to a second actuated position (e.g., downward from the position shown in FIGS. 2A and 2B), space 76 may bridge both of passages 62 and 64, allowing fluid flow therebetween. Lands 67 and 72 may function to axially limit fluid from flowing out of the ends of bore 55.

A centering spring 82 may be located at the base end of control spool 50 and used to bias control spool 50 towards its neutral position. Centering spring 82 may be a captured-type of spring, wherein both ends of spring 82 are constrained. In this configuration, spring 82 may exert biasing forces on control spool 50 during both compression and tension caused by movement of control spool 50 to the first and second actuated positions.

Body 66 of control spool 50 may include an integral feedback portion 78 located at the tip end of control spool 50 that is used to connect body 66 to both of actuators 52, 54. In the disclosed example, feedback portion 78 is a dual-ended conical ramp having tapered outer surfaces, on which a portion of actuators 52, 54 ride during axial movement of control spool 50. The tapered contours of feedback portion 78 may be designed to affect the behavior of control spool 50 and, accordingly the conical shapes of feedback portion 78 can be consistent and linear, have varying taper angles along their lengths, and/or be non-linear in some locations. For example, a center portion of feedback portion 78 can be straight (i.e., cylindrical), as shown in FIGS. 2A and 2B, and opposing ends of feedback portion 78 can have larger diameters than the center portion. With this configuration, feedback portion 78 may provide feedback during opposing movements of control spool 50.

Actuators 52, 54 may be substantially identical electro-hydraulic actuators configured to meter pilot fluid when commanded to do so by controller 20 (referring to FIG. 1). As electro-hydraulic actuators, actuators 52, 54 may be selectively energized to communicate pilot signals (e.g., variable pressure and drain signals) with corresponding tip and base ends of control spool 50. As will be described in more detail below, as control spool 50 is moved by an imbalance of pressure acting on the ends thereof, the conical ramps of feedback portion 78 may mechanically press against portions of actuators 52, 54 with a force proportional to its movement, thereby providing force feedback to actuators 52, 54.

Actuators 52, 54 may be proportional actuators movable to any position between a drain position and a fill position. When either of actuators 52, 54 are in their drain positions, tank pressure (i.e., the low-pressure of drain passage 38) may be connected with the appropriate pressure chambers located at the tip and base ends of control spool 50 via corresponding tip- and base-end passages 88 and 90, respectively. When either of actuators 52, 54 is moved to its fill (or part-fill) position, pilot fluid from pilot pump 44 may be metered into the corresponding pressure chamber at the tip end of control spool 50 via tip- and base-end passages 88 and 90, respectively. When the tip-end pressure chamber is filled with pressurized fluid at the same time that the base-end pressure chamber is drained of fluid, control spool 50 may be caused to move downward from the position depicted in FIGS. 2A and 2B. In contrast, when the base-end pressure chamber is filled with pressurized fluid at the same time that the tip-end pressure chamber is drained of fluid, control spool 50 may be caused to move upward from the position depicted in FIGS. 2A and 2B. The rate of filling and draining of the opposing pressure chambers may dictate the speed of control spool movement, and be controlled by the rate of pilot fluid flow into the pressure chambers.

In the exemplary embodiment of FIGS. 2A and 2B, actuators 52 and 54 may be mounted at least partially inside an actuator housing ("housing") 102. Housing 102 may have a bore 104 formed therein that is generally aligned with bore 55 of valve block 48. Housing 102 may be connected to an end of valve block 48, and a seal (e.g., an o-ring 106) may be located therebetween and around bores 55 and 104. Feedback portion 78 of control spool 50 may extend a distance into bore 104. A primary axis 80 of each of actuators 52, 54 may be oriented generally orthogonal to bore 104 and to axis 56 of body 66. For the purposes of this disclosure, the term "generally" may be considered to mean "within engineering tolerances."

Two separate solenoids 112 may connect to housing 102 at opposing sides thereof and form portions of actuators 52 and 54. In the disclosed example, each of solenoids 112 may be configured to electromagnetically move (e.g., push and/or pull) a corresponding pilot spool 114 within a cage 116 of either actuator 52 or actuator 54. Each of pilot spools 114 may be generally aligned with its associated axis 80, and oriented at a right-angle relative to axis 56 of control spool 50. As pilot spool 114 of actuators 52, 54 is moved within its cage 116, a proportional amount of pilot fluid from pilot passage 46 may be selectively directed to the corresponding pressure chamber via either tip-end passage 88 or base-end passage 90. Pilot spools 114 of both actuators 52, 54 may be spring-biased toward the drain positions and receive force feedback from feedback portion 78 (e.g., by way of a follower 122 tethered to pilot spool 114 via a spring 124) during movement of control spool 50 in either direction away from its neutral position. It should be noted that solenoids 112, pilot spools 114, and cages 116 may have any configuration and take any form known in the art.

Controller 20 (referring back to FIG. 1) may embody a single or multiple microprocessors that include a means for monitoring operator input and responsively energizing one or more of actuators 52 and 54 to affect movement of tool actuator 12. For example, controller 20 may include a memory, a secondary storage device, a clock, and a processor, such as a central processing unit or any other means for accomplishing a task consistent with the present disclosure. Numerous commercially available microprocessors can be configured to perform the functions of controller 20. It should be appreciated that controller 20 can readily embody a general machine controller capable of controlling numerous other machine functions. Various other known circuits may be associated with controller 20, including signal-conditioning circuitry, communication circuitry, and other appropriate circuitry. Controller 20 may be further communicatively coupled with an external computer system, instead of or in addition to including a computer system, as desired.

In some embodiments, controller 20 may rely on sensory information when regulating the flow directions and/or pressures within hydraulic circuit 10. For example, instead of or in addition to the signals generated by interface device 22, controller 20 may communicate with one or more sensors (not shown) to detect actual pressures inside hydraulic circuit 10. These sensors can be mounted in valve block 48 and/or housing 102, if desired. Controller 20 may then automatically adjust flow directions and/or pressures based on the signals generated by the sensors.

Interface device 22 may embody, for example, a single or multi-axis joystick located proximal an operator seat (not shown). Interface device 22 may be a proportional device configured to position and/or orient a work tool (not shown) by producing signals that are indicative of a desired work tool speed and/or force in a particular direction. The position signals may be used by controller 20 to cause corresponding movements of tool actuator 12 (e.g., by selectively energizing actuators 52 and/or 54). It is contemplated that different interface devices 22 may additionally or alternatively be included in hydraulic circuit 10 such as, for example, wheels, knobs, push-pull devices, switches, pedals, and other operator input devices known in the art.

INDUSTRIAL APPLICABILITY

The disclosed valve and actuators may be applicable to any hydraulic circuit. The disclosed valve and actuators may provide high-performance control of a tool actuator in a low-cost, small-footprint configuration. Control over movement of tool actuator 12 will now be described in detail with reference to FIGS. 1 and 2.

During operation of hydraulic circuit 10 (referring to FIG. 1), pump 14 may be driven to pressurize fluid. The pressurized fluid may be directed past check valve 36 to valve 18 via pressure passage 34. At this same time, pilot fluid may be pressurized by pilot pump 44 and directed to valve 18 via pilot passage 46. An operator of hydraulic circuit 10 may request movement of tool actuator 12 (e.g., extension or retraction) by manipulating (e.g., tilting) interface device 22 in a corresponding direction by a corresponding amount. Electronic signals generated by interface device 22 may be directed to controller 20, which may responsively energize or de-energize particular actuator(s) 52, 54 to achieve the desired tool motion.

During the normal or default state of valve 18, actuators 52 and 54 may be de-energized. When actuators 52 and 54 are de-energized, the biasing force of spring 82 may function to urge body 66 of control spool 50 toward its centered position, such that all passages 61, 62, 64 are inhibited from communicating with each other.

When actuator 52 or actuator 54 is energized, the corresponding pilot spool 114 may be moved inside of its associated cage 116 toward a flow-passing position, such that pilot fluid is directed through the corresponding passage 88, 90 at a rate proportional to the position of pilot spool 114. When one of actuators 52, 54 is moved to its fill position, the other of actuators 52, 54 may be simultaneously moved to its drain position at which the corresponding pressure chamber is connected with tank pressure via tip- or base-end passages 88, 90. These connections may create a force imbalance on control spool 50 that causes control spool 50 to move away from its neutral position. As described above, as body 66 of control spool 50 moves upward, space 76 may communicate passage 61 with passage 64. This can result in pressurized fluid flowing into one of head- and rod-end chambers 28 or 30 of tool actuator 12 from pump 14. As body 66 moves further upward, a greater flow area between passages 61 and 64 may be uncovered, allowing for a greater flow rate of fluid being communicated to tool actuator 12 and a corresponding greater velocity of tool actuator 12. In contrast, as body 66 of control spool 50 moves downward, space 76 may communicate passage 62 with passage 64. This can result in pressurized fluid flowing out of the one of head- and rod-end chambers 28 or 30 of tool actuator 12 and into sump 16. As body 66 moves further downward, a greater flow area between passages 62 and 64 may be uncovered, allowing for a greater rate of fluid flowing out of tool actuator 12 and a corresponding greater velocity of tool actuator 12.

As control spool 50 is moved away from its neutral position by the imbalance of fluid pressure acting thereon, followers 122 may translate this motion into feedback forces provided to pilot spools 114 and solenoids 112 of actuators 52 and 54. That is, as long as the imbalance of pressure acts on control spool 50, control spool 50 may continue to move and, in turn, cause an increasing tool actuator speed, until the feedback forces of followers 122 are about equal to the forces of solenoids 112 acting on pilot spools 114. At this point in time, when the forces acting on pilot spools 114 become about equal, fluid flows through pilot spools 114 may be restricted or even terminated, thereby slowing or even stopping further motion of control spool 50. This should result in a steady motion of tool actuator 12.

Several benefits may be associated with the disclosed valve and actuators. In particular, because the disclosed valve may include a control spool with an integral feedback portion, the component count, cost, and assembly difficulty may be low. Further, the disclosed valve and actuators may provide a desired level of force feedback, and the use of a single centering spring at only the tip end of control spool 50 may decrease a length of the disclosed valve.

It will be apparent to those skilled in the art that various modifications and variations can be made to the disclosed valve. Other embodiments will be apparent to those skilled in the art from consideration of the specification and practice of the disclosed valve. For example, although control spool 50 is described as being moved by metering fluid into pressure chambers located at opposing ends thereof, the disclosed valve may function is a similar manner by instead metering fluid out of the opposing pressure chambers, if desired. It is intended that the specification and examples be considered as exemplary only, with a true scope being indicated by the following claims and their equivalents.

What is claimed is:

1. A valve, comprising:
a valve block;
a central bore formed in the valve block;
an actuator passage formed in the valve block and intersecting with the central bore;
at least one of a supply passage and a drain passage formed in the valve block and intersecting with the central bore;
a control spool slidingly disposed in the central bore and movable to selectively connect the actuator passage and the at least one of the supply passage and the drain passage, the control spool having a base end, and a tip end with a tapered outer surface;
a first actuator configured to selectively direct pilot fluid to the tip end of the control spool;
a second actuator configured to selectively direct pilot fluid to the base end of the control spool,
wherein each of the first and second actuators have a primary axis oriented generally orthogonal to an axis of the control spool and are located at opposing sides of the control spool; and
a housing connected to the valve block and configured to receive the first and second actuators and to close off an end of the central bore in the valve block, wherein:
a first pressure chamber is formed in the housing at the tip end of the control spool;
a second pressure chamber is formed in the valve block at the base end of the control spool;
the first actuator is in fluid communication with the first pressure chamber; and
the second actuator is in fluid communication with the second pressure chamber.

2. The valve of claim 1, wherein each of the first and second actuators have a follower configured to ride along the tapered outer surface of the control spool at the tip end.

3. The valve of claim 2, wherein the tapered outer surface has a center portion and opposing outwardly tapering end portions configured to provide mechanical feedback to the followers of the first and second actuators as the control spool moves away from a neutral position in opposing directions.

4. The valve of claim 3, further including a drain passage fluidly connected to the center portion of the tapered outer surface.

5. The valve of claim 4, wherein each of the first and second actuators are further configured to selectively communicate the tip and base ends of the control spool, respectively, with the drain passage via the center portion of the tapered outer surface.

6. The valve of claim 1, further including a spring configured to bias the control spool to a neutral position.

7. The valve of claim 6, wherein the spring is located at the base end of the control spool.

8. The valve of claim 1, wherein the first actuator is substantially identical to the second actuator.

9. The valve of claim 8, wherein each of the first and second actuators is a proportional 3-way electrohydraulic actuator.

10. A valve, comprising:
a valve block;
a central bore formed in the valve block;
an actuator passage formed in the valve block and intersecting with the central bore;
at least one of a supply passage and a drain passage formed in the valve block and intersecting with the central bore;
a control spool slidingly disposed in the central bore and movable to selectively connect the actuator passage and the at least one of the supply passage and the drain passage, the control spool having a base end, and a tip end with a tapered outer surface;
a spring located at the base end of the control spool and configured to bias the control spool to a neutral position;
a first actuator configured to selectively direct pilot fluid or tank pressure to the tip end of the control spool; and
a second actuator configured to selectively direct pilot fluid or tank pressure to the base end of the control spool,
wherein:
each of the first and second actuators have a primary axis oriented generally orthogonal to an axis of the control spool;

each of the first and second actuators are located at opposing sides of the control spool; and each of the first and second actuators have a follower configured to ride along the tapered outer surface of the control spool at the tip end; and a housing connected to the valve block and configured to receive the first and second actuators and to close off an end of the central bore in the valve block, wherein:

a first pressure chamber is formed in the housing at the tip end of the control spool;

a second pressure chamber is formed in the valve block at the base end of the control spool;

the first actuator is in fluid communication with the first pressure chamber; and the second actuator is in fluid communication with the second pressure chamber.

11. The valve of claim 10, wherein the tapered outer surface has a center portion and opposing outwardly tapering end portions configured to provide mechanical feedback to the followers of the first and second actuators as the control spool moves away from a neutral position in opposing directions.

12. The valve of claim 11, further including a drain passage fluidly connected to the center portion of the tapered outer surface, wherein each of the first and second actuators are further configured to selectively communicate the tip and base ends of the control spool, respectively, with the drain passage via the center portion of the tapered outer surface.

13. The valve of claim 10, wherein the first actuator is substantially identical to the second actuator.

14. A hydraulic circuit, comprising:
an actuator;
a primary pump;
a pilot pump;
a sump; and
a valve disposed between the actuator, the primary pump, and the sump, the valve including:
a valve block;
a central bore formed in the valve block;
an actuator passage formed in the valve block and extending between the central bore and the actuator;
at least one of a supply passage and a drain passage formed in the valve block, at least one of the at least one of the supply passage and the drain passage configured to connect at least one of primary pump and the sump to the central bore;
a control spool slidingly disposed in the central bore and movable to selectively connect the actuator passage and the at least one of the supply passage and the drain passage, the control spool having a base end, and a tip end with a tapered outer surface;
a spring located at the base end of the control spool and configured to bias the control spool to a neutral position;
a first actuator configured to selectively direct pilot fluid from the pilot pump or tank pressure associated with the sump to the tip end of the control spool; and
a second actuator configured to selectively direct pilot fluid from the pilot pump or tank pressure associated with the sump to the base end of the control spool,
wherein:
each of the first and second actuators have a primary axis oriented generally orthogonal to an axis of the control spool;
each of the first and second actuators are located at opposing sides of the control spool; and
each of the first and second actuators have a follower configured to ride along the tapered outer surface of the control spool at the tip end; and
a housing connected to the valve block and configured to receive the first and second actuators and to close off an end of the bore in the valve block, wherein:
a first pressure chamber is formed in the housing at the tip end of the control spool;
a second pressure chamber is formed in the valve block at the base end of the control spool;
the first actuator is in fluid communication with the first pressure chamber; and
the second actuator is in fluid communication with the second pressure chamber.

15. The hydraulic circuit of claim 14, wherein the tapered outer surface has a center portion and opposing outwardly tapering end portions configured to provide mechanical feedback to the followers of the first and second actuators as the control spool moves away from a neutral position in opposing directions.

16. The hydraulic circuit of claim 15, further including a drain passage fluidly connected to the center portion of the tapered outer surface, wherein each of the first and second actuators are further configured to selectively communicate the tip and base ends of the control spool, respectively, with the drain passage via the center portion of the tapered outer surface.

17. The hydraulic circuit of claim 14, wherein the first actuator is substantially identical to the second actuator.

* * * * *